United States Patent Office 3,240,697
Patented Mar. 15, 1966

3,240,697
CATALYTIC CONVERSION WITH ACTIVATED
CATALYST
Joseph N. Miale, Trenton, N.J., and Paul B. Weisz,
Media, Pa., assignors to Socony Mobil Oil Company,
Inc., a corporation of New York
No Drawing. Filed Dec. 17, 1964, Ser. No. 419,230
22 Claims. (Cl. 208—120)

The application is a continuation-in-part of our copending application Serial No. 165,680, filed January 11, 1962, now U.S. Patent No. 3,175,967.

This invention relates to a process for catalytically transforming certain classes of organic compounds in the presence of a unique catalyst, the activity of which is unexpectedly enhanced or promoted upon contact with sulfur dioxide. More particularly, the present invention is concerned with a method wherein an organic charge undergoes catalytic conversion in the presence of sulfur dioxide and a catalyst consisting essentially of specified crystalline metal aluminosilicate salts.

It has heretofore been reported that various chemical reactions may be advantageously carried out by contact catalysis using as catalyst, crystalline metal aluminosilicate zeolites having rigid three-dimensional networks made up of unit cells characterized by the substantial absence of change in unit cell dimensions upon dehydration and rehydration and a homogenous highly uniform pore structure. The above requirements are fulfilled by certain crystalline zeolites known as molecular sieves. The reactions effectively catalyzed, by such materials include, by way of example, hydrocarbon cracking, alkylation, dealkylation, disproportionation, isomerization and polymerization. The ability of the above catalysts to influence and direct the course of chemical conversion entails an unusual degree of desirable catalytic selectivity. Briefly, two types of selectivity are involved; first, geometrical selectivity which depends on the relationship of the diameter of the pores in the crystal structure of the aluminosilicate zeolite and the diameter of the reactant and product molecules and second, intrinsic catalytic selectivity which depends on the choice of cations present on the internal surfaces of the crystalline metal aluminosilicate salt.

In accordance with the present invention, it has now been discovered that the catalytic characteristics of the above-indicated crystalline aluminosilicate salts are enhanced and advantagageously promoted when catalytic transformation is carried out in the presence of such materials which have undergone contact prior to completion of the desired transformtion with sulfur dioxide. Thus, it has been found that treatment of the crystalline metal aluminosilicate catalyst with sulfur dioxide may be carried out as a pretreating step or alternatively, the sulfur dioxide may be introduced into the reaction zone simultaneously with the charge stock or subsequent to introduction of the charge stock but prior to compeltion of the desired catalytic transformation. Thus, it has been found that the presence in the reaction zone of sulfur dioxide increases the rate of a catalytic conversion reaction such as paraffin cracking with certain crystalline metal aluminosilicates under conditions for which catalytic activity already exists. In addition, it has been found by pretreating with sulfur dioxide that a crystalline metal aluminosilicate which normally possesses little or no catalytic activity by reason of its being non-porous to the components of the reaction charge is rendered catalytically active. Likewise, it has been found by introducing sulfur dioxide into a reaction zone containing a small pore size crystalline metal aluminosilicate normally inactive in conversion of the charge stock due to the inability of the charge components to enter the pores of the aluminosilicate, that such metal aluminosilicate is catalytically activated. Thus, with the present invention it has been discovered that the presence of sulfur dioxide unexpectedly enhances the catalytic activity and utility of the crystalline metal aluminosilicate zeolites.

In one embodiment, the present invention provides a method for effecting transformation of organic compounds, catalytically convertible in the presence of acidic catalyst sites, by contacting the same under conversion conditions with a catalyst of a crystalline metal aluminosilicate having rigid three-dimensional networks made up of unit cells characterized by the substantial absence of change in unit cell dimensions upon dehydration and rehydration and a homogeneous pore structure made up of highly uniform interstitial dimensions, which catalyst has undergone contact prior to completion of said transformation reaction with an amount of sulfur dioxide sufficient effectively to enhance the activity of sulfur thereof.

In another embodiment, the invention affords a method for cracking a hydrocarbon charge in the presence of sulfur dioxide and a crystalline metal aluminosilicate catalyst.

In a further embodiment, the invention resides in a method for converting organic compounds catalytically convertible in the presence of acidic catalyst sites by contacting the same with a crystalline metal aluminosilicate having a uniform pore structure made up of pores incapable of affording substantial entry into the interior of the aluminosilicate of the organic compound charge, which aluminosilicate has undergone contact prior to conversion of said charge with an amount of sulfur dioxide effectively to enhance the activity thereof.

The metal aluminosilicates employed as catalysts in the process of this invention are essentially dehydrated forms of crystalline siliceous zeolites, containing varying quantities of alkali metal, alkaline earth metal and aluminum with or without other metals. All or a portion of the alkali metal and alkaline earth metal ions normally contained in the zeolitic structure may be replaced with a number of other ions. The atoms of alkali metal, alkaline earth metal or metals in replacement thereof, silicon, aluminum and oxygen are arranged in a definite and consistent crystalline pattern. Such structure contains a large number of small cavities, interconnected by a number of still smaller channels. These cavities and channels are precisely uniform in size. The interstitial dimensions or openings in the crystal lattice limit the size and shape of the molecules than can enter the interior of the aluminosilicate and it is such characteristic of many crystalline zeolites that has led to their designation as "molecular sieves."

Zeolites having the above characteristics include both natural and synthetic materials, for example, chabazite, gmelinite, mesolite, ptiliolite, mordenite, natrolite, nephelite, sodalite, scapolite, lazurite, leucite and cancrinite. Synthetic zeolites may be of the A-type, X-type, Y-type, L-type, T-type or other well known form of molecular sieve, including ZK zeolites such as those described in copending application Serial No. 134,841, filed August 30, 1961. Preparation of the above type zeolites is well known, having been described in the literature, for example A-type zeolite in U.S. 2,882,243; X-type zeolite in U.S. 2,882,244; Y-type zeolite in U.S. 3,130,007; and T-type zeolite in U.S. 2,950,952. As initially prepared, the metal of the aluminosilicate is an alkali metal and usually sodium. Such alkali metal is subject to base-exchange with a wide variety of other metal ions. The molecular sieve materials so obtained are unusually porous, the pores having highly uniform molecular dimensions, generally between about 3 and about 15 Angstrom units in diameter. Each crystal of molecular sieve material contains literally billions of tiny cavities or cages interconnected by channels of unvarying diameter. The size and portion of the metal ions in the crystal control the effective diameter of the interconnecting channels.

At the present time, there are commercially available molecular sieves of the "A" series and of the "X" series. A synthetic zeolite known as "Molecular Sieve 4A" is a crystalline sodium aluminosilicate having channels of about 4 Angstroms in diameter. In the hydrated form, this material is chemically characterized by the formula:

$$Na_{12}(AlO_2)_{12}(SiO_2)_{12} \cdot 27H_2O$$

The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the ratio of one calcium for two sodium ions. A crystalline sodium aluminosilicate having pores approximately 10 Angstroms in diameter is also available commercially under the name of "Molecular Sieve 13X." The letter "X" is used to distinguish the interatomic structure of this zeolite from that of the "A" crystals mentioned above. As prepared, the 13X material contains water and has the unit cell formula:

$$Na_{86}[(AlO_2)_{86}(SiO_2)_{106}] \cdot 267H_2O$$

The 13X crystal is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels about 10 Angstroms in diameter and in which a substantial proportion of the sodium ions of the 13X material have been replaced by calcium.

Molecular sieves of the "X" series are characterized by the formula:

$$\underset{n}{M_{86}}[(AlO_2)_{86}(SiO_2)_{106}] \cdot 267H_2O$$

where M is Na+, Ca++ or other metal ions introduced by replacement thereof and $n$ is the valence of the cation M. The structure consists of a complex assembly of 192 tetrahedra in a large cubic unit cell 24.95 A. on an edge. Both X and Y type crystalline aluminosilicates have essentially identical crystal structures. They differ from each other in chemical composition with type Y aluminosilicate having a higher $SiO_2/Al_2O_3$ ratio than the X type aluminosilicate.

The alkali metal generally contained in the naturally occurring or synthetically prepared zeolites described above may be replaced partially or completely by other metal ions. Suitable replacing ions include other alkali metals, for example sodium may be replaced with lithium or potassium; alkaline earth metals such as calcium, strontium and magnesium, as well as various other ions such as those of cobalt, zinc, silver, nickel, copper, chromium, iron, zirconium, thorium, beryllium, manganese, palladium, tin, rhenium, aluminum, gold, platinum, cadmium, mercury, lanthanum, cerium and other rare earth metals. Replacement is suitably accomplished by contacting the intially formed crystalline aluminosilicate with a solution of an ionizable compound of the metal ion which is to be zeolitically introduced into the molecular sieve structure for a sufficient time to bring about the extent of desired introduction of such ion. After such treatment, the ion exchanged product is water washed, dried and calcined. The extent to which exchange takes place can be controlled. It is essential that the aluminosilicate undergoing activation in accordance with the present invention be a metal-containing aluminosilicate. Aluminosilicates in which all of the initial alkali metal is replaced by hydrogen or ammonium ions do not respond to activation with sulfur dioxide. While the metal aluminosilicate employed may have been treated to effect a partial replacement of the metal ions with hydrogen or ammonium ions, it is essential that the aluminosilicate undergoing activation contain at least some metal cations. Such materials are designated herein as metal aluminosilicates.

The metal aluminosilicates may be employed directly as a catalyst or it may be combined with a suitable support or binder. The particular chemical composition of the latter is not critical. It is however necessary that the support or binder employed be thermally stable under the conditions at which the conversion is carried out. Thus, it is contemplated that solid porous adsorbents, carriers and supports of the type heretofore employed in catalytic operations may feasibly be used in combination with the crystalline metal aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may feasibly be prepared as described in copending application of Albert B. Schwartz, Serial No. 147,722, filed October 26, 1961, and now abandoned, by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be base-exchanged to introduce selected metal ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportions. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl ortho silicate, acidification of an alkali metal silicate, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the present process is preferably used in the form of small fragments of a size best suited for operation under the specific conditions existing. Thus, the catalyst may be in the form of a finely divided powder or may be in the form of pellets of $1/16''$ or $1/8''$ size, for example, obtained upon pelleting the crystalline aluminosilicate with a suitable binder such as clay, colloidal graphite, etc. Likewise, the metal aluminosilicate dispersed in a gel matrix or supported on a suitable porous support of the type described above may be utilized in any desired physical form. For example, a hydrosol containing added crystalline metal aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrosol may be introduced into the perforations of a perforated plate and retained therein until the sol has set to a hydrogel, after which the formed hydrogel pieces are removed from the plate. A particularly feasible method is to prepare the catalyst in the form of spheroidal particles by dispersing the powdered metal aluminsilicate in a hydrosol and introducing globules of the resulting hydrosol into a body of water-immiscible liquid, for example an oil medium, wherein the globules of hydrosol set to a hydrogel and subsequently pass into an underlying layer of water from which they are sluiced to further processing operations such as base-exchange, water-washing, drying and calcining. Larger size spheres are ordinarily within the range of from about $1/64$ to about $1/4$ inch in diameter, whereas smaller size spheres, which are generally referred to as microspheres, are within the range of from about 10 to about 100 microns in diameter. The use of the spheroidally shaped particles is of particular advantage in hydrocarbon conversion processes in which the catalyst is subjected to continuous movement, such as the compact moving bed process, the fluidized process, etc. As applied to the stationary bed, spheroidal catalyst particles provide effective contact between the reactants and the catalyst by avoiding channeling.

While, for the production of spheroidal catalyst particles by the aforementioned technique, initial formation of a hydrosol which sets upon lapse of a short interval of time to an all-embracing bead-form hydrogel is essential, it is also feasible to employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitate and mixtures of the two. Also the matrix may consist of or contain, as a component thereof, a clay and particularly a clay of the montmorillonite or gaolinite families, either raw or acid treated. Other suitable materials for use as the matrix of the present catalyst composition include charcoal, graphite, bauxite and other binders compatible with the crystalline metal aluminosilicate and thermally stable under the temperature conditions at which the catalyst is used.

It is within the purview of the invention to employ a material which undergoes decomposition at the temperature of contact with the catalyst to sulfur dioxide.

Contact of the metal aluminosilicate catalyst with sulfur dioxide may be conducted as a pretreating step before bringing the catalyst into contact with the organic charge. Alternatively, sulfur dioxide may be introduced simultaneously with the charge gas to contact with the crystalline aluminosilicate catalyst or sulfur dioxide may be introduced into the reaction zone after contact between the charge stream and the aluminosilicate catalyst has been carried out for a predetermined interval of time. Also, in some instances it may be desirable to periodically introduce sulfur dioxide into the reaction zone while the charge gas is fed continuously thereto. The aluminosilicate catalyst may also be given a periodic treatment with sulfur dioxide while use of contact with the charge gas, for example after periodic regeneration of the catalyst but prior to placing the regenerated catalyst on stream. It will be understood that the various above means for contacting the catalyst and sulfur dioxide do not necessarily afford equivalent or comparable results. It is, however, essential that contact between the catalyst and sulfur dioxide be made prior to substantial completion of the conversion consideration.

The temperature at which activation of the crystalline metal aluminosilicate with sulfur dioxide is carried out is an important factor. Thus, it has been established that activation rapidly decreases with the temperatures below about 800–900° F. Accordingly, the temperature at which activation of the crystalline metal aluminosilicate is effected with sulfur dioxide containing activator described herein should be above 800° F. and preferably in the range of 900° F. to 1250° F.

The amount of sulfur dioxide utilized in any instance is sufficient to effectively enhance the activity of the aluminosilicate catalyst. The particular amount of sulfur dioxide required to attain the desired promoting effect will vary depending on the specific catalyst employed and the nature of the catalytic process involved. Generally, however, sulfur dioxide will be brought into contact with the catalyst in an amount corresponding to between about 0.1 and about 25 percent by weight based on the catalyst. In continuous operations, a rate of feed of sulfur dioxide of about 1 percent to about 100 percent by weight per hour based on the catalyst will generally be employed although in some instances amounts as small as 0.2 weight percent per hour may be used. Generally, the catalyst to charge stock volume ratio employed in carrying out the reactions contemplated by the present invention is within the approximate range of 0.1 to 10. The volume ratio of sulfur dioxide to charge in the reaction zone is generally within the range of about 0.1 to about 10. Although a continuous feed of sulfur dioxide has been found to be most effective particularly in continuous process operations, there are reactions in which a transient contact with sulfur dioxide produces a fairly long period of activation. In such case, it is feasible to treat the catalyst intermittently with sulfur dioxide rather than with a continuous stream. In processes operated on a batch basis, the supply of sulfur dioxide may consist of part of the charge.

Although the effectiveness of activation of the crystalline metal aluminosilicate catalyst with sulfur dioxide as described herein has been observed with different ionic forms of the above-described crystalline aluminosilicates, the greatest increase in activation has been observed with the alkali and alkaline earth aluminosilicate salts. A very marked effect of sulfur dioxide has been realized with alkali metal and alkaline earth metal crystalline aluminosilicates having uniform pore openings in the range of 5 to 15 Angstroms. It has been established that after contact with sulfur dioxide as described herein, such materials are activated to a level of catalytic effectiveness which is greatly above that achieved with the use of the untreated catalyst. Thus, it has been found that the catalytic activities of the crystalline metal aluminosilicate catalysts which have undergone treatment with sulfur dioxide possess catalytic activities several fold the activities of the same catalysts which have not been so treated.

For certain of the crystalline aluminosilicates, particularly those composed of networks of sodalite units including, for example, X-type sodium aluminosilicate and sodalite, it has been observed that the catalyst retains increased activity after being subjected to treatment with sulfur dioxide and subsequently removed from contact with such activator. For these aluminosilicates initial contacting with sulfur dioxide may be followed by operation without continuous treatment. For example, sulfur dioxide contact can be practiced as a pretreating operation or as a periodic treatment. The latter method of operation is particularly applicable as part of a cyclic operation, i.e. after regeneration of the catalyst and prior to catalytic conversion.

It has been found that crystalline metal aluminosilicates which are essentially inactive in catalyzing reactions in the presence of acidic catalyst sites by reason of their small uniform pore structure incapable of penetration by the organic charge may be rendered catalytically active by treatment with sulfur dioxide. Thus, following the teachings of this invention it is possible to convert essentially inactive metal aluminosilicate having uniform pore openings of 3 to 4 Angstroms in diameter to catalytically active materials by treatment with sulfur dioxide. In such manner, sodalite, A-type sodium aluminosilicate and A-type potassium aluminosilicate having pores incapable of penetration by the organic charge, may be formed into useful catalysts by contact with sulfur dioxide utilizing the technique of the instant invention.

Treatment of silica-alumina gel conversion catalysts with sulfur dioxide afforded only a minor improvement in activity when compared with that achieved upon treatment of the crystalline metal aluminosilicates. Likewise, activation of clay hydrocarbon conversion catalysts with sulfur dioxide results in only comparatively minor improvement in activity as contrasted with the very marked improvement realized upon activation of the crystalline metal aluminosilicates with sulfur dioxide.

The reactions promoted by the sulfur dioxide activated crystalline aluminosilicate zeolites described herein involve conversion of certain classes of organic compounds including cracking of paraffinic, olefinic, aromatic and naphthenic hydrocarbons as well as mixtures thereof, for example petroleum fractions such as those boiling in the gas oil range; disproportionation of aromatics; dehydration of alcohols to olefins and ethers; hydration of olefins to alcohols; isomerization and polymerization of olefins; isomerization of terpenes; alkylation and dealkylation of aromatic hydrocarbons.

The cracking of hydrocarbons and particularly normal hydrocarbons having a carbon chain of from 5 to 30 carbon atoms represents an especially advantageous use of the sulfur dioxide activated crystalline aluminosilicate catalysts since the nature of the products may be well controlled. The catalyst in such process may be used as pellets in a fixed bed operation or they may be used in a compact moving bed operation or in a fluidized operation. The general operating conditions cover a wide range because of the wide utility of the catalyst. In cracking paraffins for the production of olefins, it is generally desirable to carry out such process at atmospheric pressure, employing a temperature in the approximate range of 700 to 1200° F. and preferably 900 to 1000° F. The liquid hourly space velocity of the charge may range from 0.2 to 4.0, preferably from 0.5 to 2.0. The normal paraffins that may be charged range from $C_5$–$C_{30}$ paraffins and mixtures thereof. Generally, the conversion of charge improves with increasing molecular weight so that for hexane cracking, for example, the low ranges of space velocity and higher temperatures are desirable for satisfactory conversion. The cracking of other crackable hydrocarbons including aromatics containing alkyl chains, naphthenes and olefins is likewise advantageously carried out with the hereinabove described catalysts which have undergone treatment with sulfur dioxide.

Thus, as illustrative of the usefulness of this invention it has been established that paraffinic hydrocarbons may be cracked over the sulfur dioxide activated crystalline metal aluminosilicate catalysts to afford a high yield of olefins. The latter are particularly desirable products since they are susceptible to a wide variety of useful application. They may be employed, for example, in the formation of high octane alkylate; they also may be used for alkylation of benzene to form cumene and other alkyl benzenes; or they may be polymerized to liquid fuels or to form plastics such as polyethylene and polypropylene. In many instances, these desirable olefin products may be formed in high yields by cracking low-valued petroleum charge stocks such as paraffinic materials in the $C_6$–$C_{10}$ range.

In addition to cracking, it is contemplated that the sulfur dioxide-activated crystalline metal aluminosilicate catalyst described herein may be effectively employed in various other reactions in which organic compounds undergo chemical conversion or transformation into useful products in the presence of acidic catalyst sites. Thus, the isomerization of olefins and cycloolefins such as terpenes and alkylcyclopentanes; the dehydration of alcohols to ethers and olefins; the disproportionation of aromatic compounds; the polymerization of olefins and vinyl aromatic compounds and the alkylation and dealkylation of aromatics are all reactions which normally are catalyzed by acidic catalysts. The promotion of such reactions over the crystalline metal alumino-silicate catalysts referred to herein are thus logically to be included within the scope of the present invention.

As is well known in the art, the conversion scale approximates a scale of per-unit-catalyst activity scale only at low conversion, since conversion approaches a constant of 100 percent for arbitrarily large per-unit-catalyst activation. The relationship between fractional conversion C and catalytic activity, i.e. the catalytic activity rate constant per unit quantity of catalyst, $k$, is usually and conveniently based on a first order rate law and may be expressed as follows: $C = 1 - e^{-k\tau}$ wherein $\tau$ is the residence time. If residence time remains the same for two catalysts to be compared this relationship results in the following relationship for the activity ratio $n = k_2/k_1$ on the observed fractional conversion in the two cases $C_1$ and $C_2$:

$$n = \frac{k_2}{k_1} = \log \frac{1}{1-C_2} \Big/ \log \frac{1}{1-C_1}$$

In this manner the increase of activity between the sulfur dioxide activated conversion and that carried out in the absence of sulfur dioxide can, regardless of the conversion level, be conveniently noted.

The following examples will serve to illustrate the method of the present invention without limiting the same.

EXAMPLE 1

A sample of 1.5 ml. of sodium X-type crystalline alumino-silicate, known commercially as Molecular Sieve 13X, was tested for n-hexane cracking activity. A stream of helium was bubbled through liquid n-hexane to vaporize the charge giving a vapor pressure of 153 mm. of n-hexane in the charge stream. Contact of the catalyst and charge was carried out at atmospheric pressure, utilizing a residence time of 18 seconds in a heated reactor containing 3 cc. of the catalyst maintained at 1000° F. Samples of the gaseous products were analyzed by gas chromatography at specified intervals. After 1 hour on stream, gaseous sulfur dioxide was added to the feed at a rate of 0.5 ml. per minute. Sulfur dioxide addition was stopped after 192 minutes. The catalyst was regenerated after 350 minutes on stream. The results obtained are shown below in Table I:

Table I

| Time on stream, Min. | Temp. °F. | SO$_2$ | n-Hexane Conversion, Percent | Increase (n-fold) In Activity |
|---|---|---|---|---|
| 10 | 1,000 | Off | 12.1 | 1 |
| 60 | 1,000 | On | | |
| 70 | 1,000 | On | 17.7 | 1.4 |
| 190 | 1,000 | On | 63.3 | 7.0 |
| 192 | 1,000 | Off | | |
| 220 | 1,000 | Off | 55.3 | 5.7 |
| 290 | 1,000 | Off | 54.7 | 5.5 |
| 350 | 900 | Off | 5.8 | 2.5 |
| 10 (Regenerated) | 1,000 | Off | 55.5 | 5.7 |

It will be seen from the above that very substantial activation effects are attained in the presence of sulfur dioxide and that such increase in activity was retained by the catalyst even after the addition of gaseous SO$_2$ was cut off, providing the temperature was maintained at about 1000° F. As will be noted, when the temperature was reduced to 900° F. much of the activation was lost. It is accordingly preferable that the temperature during the course of activation be maintained above 900° F., and more preferably at about 1000° F. or higher.

EXAMPLE 2

A sample of sodium Y-type crystalline aluminosilicate was tested for n-hexane cracking activity according to the procedure of Example 1. Another sample of sodium Y-type crystalline aluminosilicate was activated by pretreatment with sulfur dioxide at 800° F. for five hours. The activated catalyst was tested for n-hexane cracking activity and the results are shown below in Table II:

Table II

| Catalyst | Activation | Temp., °F. | n-Hexane Conversion, percent | Increase (n-fold) In Activity |
|---|---|---|---|---|
| NaY | None | 1,000 | 12.0 | |
| NaY | SO$_2$ pretreat. | 1,000 | 62.0 | 8 |

It will be seen from the above data that an eight-fold increase in activity was effected by sulfur dioxide pretreatment of sodium Y-type crystalline aluminosilicate.

EXAMPLE 3

A sample of sodium A-type crystalline aluminosilicate was tested for n-hexane cracking activity according to the method of Example 1. Another sample of sodium A-type crystalline aluminosilicate was activated by pretreatment with sulfur dioxide at 700° F. for five hours. The activated catalyst was tested for n-hexane cracking activity. Additionally the activated catalyst was tested for size-selectivity by conversion of 2-methyl pentane under the same conditions as employed above for n-hexane cracking. The results are compared below in Table III.

Table III

| Catalyst | Activation | Temp., °F. | Delete Conversion, percent | Increase (n-fold) In Activity |
|---|---|---|---|---|
| NaA | None | 1,000 | 1.2 (n-hexane). | |
| NaA | SO$_2$ pretreat. | 1,000 | 31.0 (n-hexane). | 32 |
| NaA | SO$_2$ pretreat. | 1,000 | 0.4 (2-Me pentane). | |

It will be seen from the above data that sodium A-type crystalline aluminosilicate is ineffective for the cracking of n-hexane because the pore openings (about 4 A.) preclude ready access of n-hexane molecules to the internal surface. However, activation by pretreatment with sulfur dioxide apparently effects lattice expansion and allows a thirty-two-fold increase of activity for n-hexane cracking. It should be noted, however, that the activated sodium A-type crystalline aluminosilicate retained shape selectivity, as shown by its low activity for the cracking of 2-methyl pentane. Thus, sulfur dioxide activation of sodium A-type crystalline aluminosilicate effected an increase in lattice dimension or pore size from about 4 A. to about 5 A.

EXAMPLE 4

A stream of helium was bubbled through liquid n-hexane and water at a rate of 10 ml./min. at room temperature and thereafter over a bed of 1.5 ml. of the sodium X-type aluminosilicate maintained at a temperature of 1000° F. Cracking was initially carried out in the absence of sulfur dioxide. After 50 minutes sulfur dioxide was introduced into the charge stream at a rate of 0.5 ml./min. After 286 minutes the addition of sulfur dioxide was stopped. Samples of the gaseous products were analyzed by gas chromatography at periodic intervals. The results are shown below in Table IV.

Table IV

| Time on Stream. Min. | SO$_2$ | n-Hexane Conversion, Percent | Increase (n-fold) In Activity |
|---|---|---|---|
| 15 | Off | 12.2 | 1 |
| 40 | Off | 8.4 | 0.6 |
| 50 | On | | |
| 70 | On | 59.8 | 6.4 |
| 280 | On | 50.0 | 4.8 |
| 286 | Off | | |
| 310 | Off | 36.1 | 3.1 |
| 370 | Off | 36.2 | 3.1 |

It will be seen from the above data that at 15 and 40 minutes on stream time water alone brings about a deactivation of the aluminosilicate. Upon addition of sulfur dioxide, a marked improvement in cracking activity was obtained and even after the addition of sulfur dioxide was stopped the catalyst still retained a substantial improved cracking activity.

EXAMPLE 5

For comparative purposes, a sample of 46 Al silica-alumina commercial cracking catalyst was tested for sulfur dioxide activation according to the method of Example 1. The results are given below in Table V.

Table V

| Time on Stream, Min. | Catalyst | SO$_2$ | n-Hexane Conversion, Percent | Increase (n-fold) In Activity |
|---|---|---|---|---|
| 5 | 46 Al-Si/Al | Off | 12.5 | 1 |
| 10 | 46 Al-Si/Al | On | | |
| 20 | 46 Al-Si/Al | On | 42.2 | 4 |
| 30 | 46 Al-Si/Al | Off | | |
| 40 | 46 Al-Si/Al | Off | 12.8 | 1 |

It will be seen from the above data that sulfur dioxide enhanced the commercial silica-alumina cracking catalyst and effected a four-fold increase in activity. However, such activity increase was not permanent, and after ten minutes off stream the sulfur dioxide had been purged from the catalyst and no further activation was noticed. Thus, it would seem apparent that the activation of silica-alumina was due to the additive effect of sulfur dioxide, and no activation of the catalyst was achieved. Such distinction is manifesty shown by a comparison with Example 1, wherein sulfur dioxide activation maintained a nearly six-fold increase in activity even after sulfur dioxide addition had been stopped for 100 minutes.

Thus, it is concluded that sulfur dioxide is adsorbed on a silica-alumina and effects an increase in conversion due to its inherent catalytic activity, while sulfur dioxide effects a permanent activation of a crystalline metal aluminosilicate. The enhancement of silica-alumina is lost when sulfur dioxide is desorbed therefrom. The activation of a crystalline metal aluminosilicate, by way of comparison, is more permanent and is retained.

It will be evident from the foregoing examples described herein that crystalline metal aluminosilicates, upon treatment with sulfur dioxide, become vastly improved catalytic components for effecting transformation of organic compounds, catalytically convertible in the presence of acidic catalyst sites. It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

We claim:
1. A method for effecting transformation of organic compounds, catalytically convertible in the presence of acidic catalyst sites, which comprises contacting the same under conversion conditions, including a temperature in excess of about 900° F., with a catalyst of a crystalline metal aluminosilicate which has undergone contact prior to completion of said transformation with sulfur dioxide, at a temperature in excess of about 800° F., present in an amount sufficient to effectively enhance the activity of said catalyst, which catalysts has rigid three-dimensional networks made up of unit cells characterized by the substantial absence of change in unit cell dimensions upon dehydration and rehydration and a uniform pore structure made up of pores of between about 3 and about 15 Angstroms in diameter.

2. The method of claim 1 wherein said crystalline metal aluminosilicate is an alkali metal aluminosilicate.

3. The method of claim 1 wherein said crystalline metal aluminosilicate is sodium X-type crystalline aluminosilicate.

4. The method of claim 1 wherein said crystalline metal aluminosilicate is sodium Y-type crystalline aluminosilicate.

5. The method of claim 1 wherein said crystalline metal aluminosilicate is a sodium aluminosilicate.

6. A method for effecting transformation of organic compounds, catalytically convertible in the presence of acidic catalyst sites, which comprises contacting the same under conversion conditions including a reaction temperature in excess of about 900° F. with a catalyst consisting essentially of a crystalline metal aluminosilicate in finely divided form and a binder therefor, which catalyst has undergone contact prior to completion of said transformation with sulfur dioxide, at a temperature in excess of about 800° F., present in an amount sufficient to effectively enhance the activity of said catalyst, the aluminosilicate component of said catalyst having rigid three-dimensional networks made up of unit cells characterized by the substantial absence of change in unit cell dimensions upon dehydration and rehydration and a uniform pore structure made up of pores of between about 3 and about 15 Angstroms in diameter.

7. The method of claim 6 wherein said crystalline metal aluminosilicate is sodium X-type aluminosilicate.

8. The method of claim 6 wherein said crystalline metal aluminosilicate is sodium Y-type aluminosilicate.

9. A method for effecting transformation of organic compounds, catalytically convertible in the presence of acidic catalyst sites, which comprises contacting the same under conversion conditions including a temperature of at least about 900° F. with a catalyst consisting essentially of a crystalline metal aluminosilicate contained in an inorganic oxide gel matrix, which catalyst has undergone contact prior to completion of said transformation with sulfur dioxide, at a temperature in excess of about 800° F., present in an amount sufficient to effectively enhance the activity of said catalyst, the aluminosilicate component of said catalyst having rigid three-dimensional networks made up of unit cells characterized by the substantial absence of change in unit cell dimensions upon dehydration and rehydration and a uniform pore structure made up of pores of between about 3 and about 15 Angstroms in diameter.

10. The method of claim 9 wherein said inorganic oxide gel matrix is silica-alumina.

11. The method of claim 10 wherein said crystalline metal aluminosilicate is sodium X-type aluminosilicate.

12. The method of claim 10 wherein said crystalline metal aluminosilicate is sodium Y-type aluminosilicate.

13. The method of claim 9 wherein said inorganic oxide gel matrix is silica-alumina-zirconia.

14. A method for cracking a hydrocarbon charge which comprises contacting the same under catalytic cracking conditions including a temperature of at least about 900° F. with a catalyst of a crystalline metal aluminosilicate which has undergone contact prior to completion of said cracking with sulfur dioxide, at a temperature in excess of about 800° F., present in an amount sufficient to effectively enhance the activity of said catalyst which catalyst has rigid three-dimensional networks made up of unit cells characterized by the substantial absence of change in unit cell dimensions upon dehydration and rehydration and a uniform pore structure made up of pores of between about 3 and about 15 Angstroms in diameter.

15. A method for cracking a normaly paraffinic hydrocarbon, having a carbon chain of from 5 to 30 carbon atoms which comprises contacting the same under catalytic cracking conditions including a temperature in excess of about 900° F. with a catalyst of a crystalline metal aluminosilicate which has undergone contact prior to completion of said cracking with sulfur dioxide, at a temperature in excess of about 800° F., present in an amount sufficient to effectively enhance the activity of said catalyst, which catalyst has rigid three-dimensional networks made up of unit cells characterized by the substantial absence of change in uniform pore structure made up of pores of between about 3 and about 15 Angstroms in diameter.

16. A method for effecting transformation of organic compounds, catalytically convertible in the presence of acidic catalyst sites, which comprises contacting the same under conversion conditions including a temperature in excess of about 900° F. with a catalyst of a crystalline metal aluminosilicate having pores normally incapable of penetration by said organic compounds, which catalyst has undergone contact prior to completion of said transformation with sulfur dioxide, at a temperature in excess of about 800° F., present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 about 5 Angstroms in diameter.

17. The method of claim 16 wherein said crystalline metal aluminosilicate is sodium A-type aluminosilicate.

18. A method for cracking a hydrocarbon charge which comprises contacting the same under catalytic cracking conditions including a temperature in excess of about 900° F. with a catalyst of a crystalline metal aluminosilicate which has undergone pretreatment with sulfur dioxide, at a temperature in excess of about 800° F., present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and 15 Angstroms in diameter.

19. A method for cracking a hydrocarbon charge which comprises passing the same through a reaction zone containing a catalyst of a crystalline metal aluminosilicate, maintained under conversion conditions including a temperature in excess of about 900° F., introducing into and maintaining during cracking in said reaction zone sulfur dioxide present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 15 Angstroms in diameter.

20. The method of claim 19 wherein said catalyst is a crystalline metal aluminosilicate selected from the group consisting of X-type, Y-type and A-type aluminosilicate and incorporated in a silica-alumino matrix.

21. A method for activating a crystalline aluminosilicate catalyst which comprises contacting a catalyst comprising a crystalline metal aluminosilicate, characterized by rigid three-dimensional networks of unit cells having a uniform pore structure of pores of a diameter between about 3 and about 15 Angstrom units, with sulfur dioxide present in an amount sufficient to effectively enhance the activity of said catalyst and, while said crystalline metal aluminosilicate is in contact with sulfur dioxide, subjecting said catalyst to a temperature in excess of about 800° F.

22. The activation method of claim 21 wherein said crystalline metal aluminosilicate is incorporated in an inorganic oxide matrix.

References Cited by the Examiner

UNITED STATES PATENTS

| | | | |
|---|---|---|---|
| 2,343,927 | 3/1944 | Roberts | 208—113 |
| 3,033,778 | 5/1962 | Frilette | 208—120 |

OTHER REFERENCES

"Theory of Catalytic Cracking," by Greensfelder, page 145, vol. 2, Chemistry of Petroleum Hydrocarbons, Reinhold Pub. Corp., New York, 1955.

DELBERT E. GANTZ, *Primary Examiner.*

ALPHONSO D. SULLIVAN, PAUL M. COUGHLAN,
*Examiners.*